United States Patent Office 3,529,477
Patented Sept. 22, 1970

---

3,529,477
GYROSCOPIC ROTOR SUSPENSION
Thomas R. Quermann, Huntington Station, N.Y., assignor to Sperry Rand Corporation, a corporation of Delaware
Filed Apr. 10, 1968, Ser. No. 720,127
Int. Cl. G01c 19/02
U.S. Cl. 74—5               6 Claims

ABSTRACT OF THE DISCLOSURE

Gyroscopic apparatus having a gyroscopic rotor that is freely suspended by a radial flexure support member having a first spring centering gradient characteristic and by an axial flexure support means having first and second portions with second and third spring centering gradient characteristics, respectively, in which the first and second spring centering gradient characteristics tend to be compensated by the third spring centering gradient characteristic to minimize the elastic restraint of the suspension.

---

BACKGROUND OF THE INVENTION

Field of the invention

This invention pertains to rotor suspension apparatus for gyroscopic devices.

Description of the prior art

The trend in gyroscopic manufacture is toward smaller, less expensive and more reliable gyroscopic apparatus particularly for use in automatic flight control systems and inertial guidance systems. The present invention is an improvement in these respects over the gyroscope disclosed in U.S. Pat. No. 2,719,291 of W. G. Wing entitled "Rate of Turn Gyroscope" primarily because of the improved rotor suspension of the present invention.

SUMMARY OF THE INVENTION

The present invention concerns gyroscopic apparatus wherein a gyroscopic rotor is adapted for spinning about a spin axis by means of a drive shaft in which first flexure support means radially support the rotor on the drive shaft for universal tilting about axes perpendicular to the spin axis which has a first spring centering gradient characteristic. The gyroscopic rotor is axially supported on the drive shaft by a second flexure support means which extends through the first flexure support means for universal tilting about axes perpendicular to the spin axis. The second flexure support means has first and second portions having second and third spring centering gradient characteristics, respectively. The first and second flexure support means are disposed in such a manner that the first and second spring centering gradient characteristics tend to be compensated by the third spring centering gradient characteristic thereby providing an anisoelastic gyro suspension and compensation for undesirable restraining torques.

DESCRIPTION OF THE PREFERRED EMBODIMENTS

Figure 1:
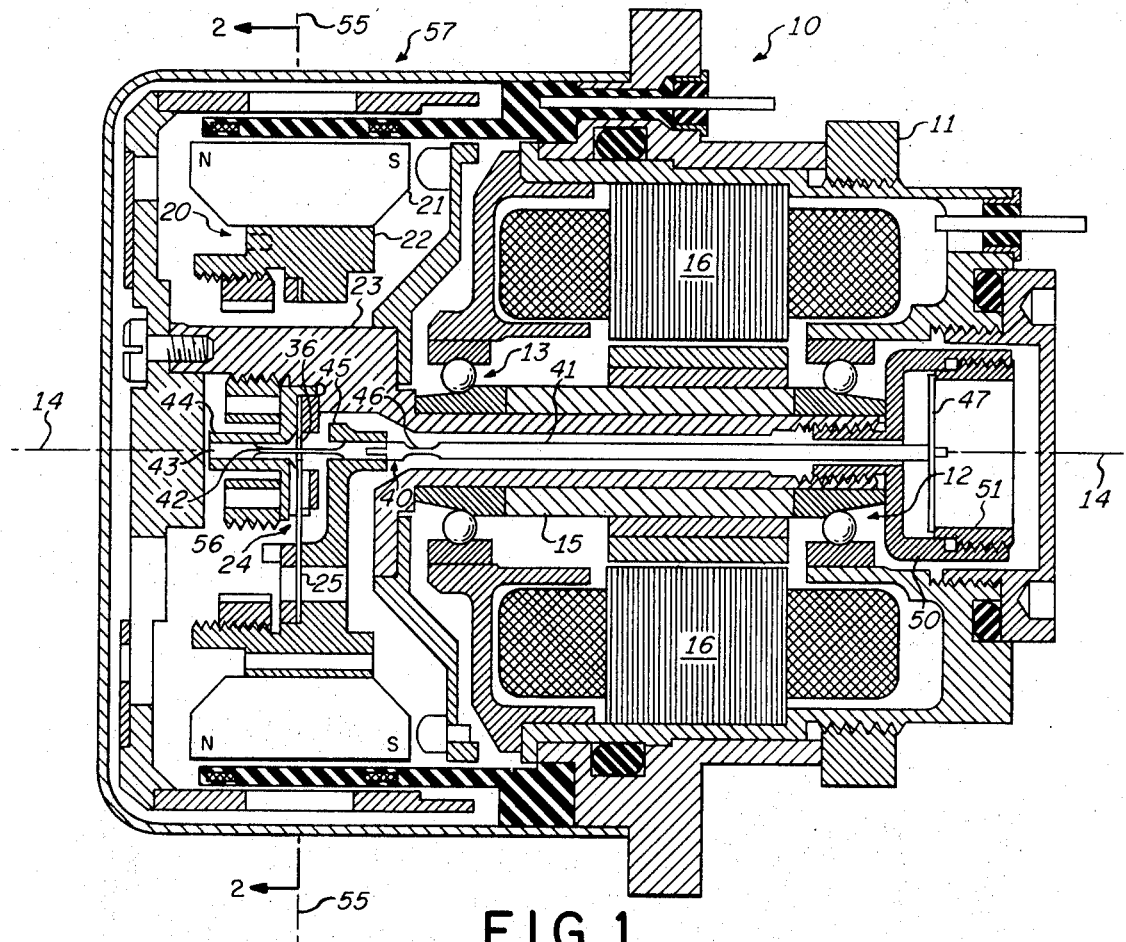
FIG. 1 is an elevation view in cross-section of a gyroscope incorporating the improved rotor suspension of the present invention.
Figure 2:
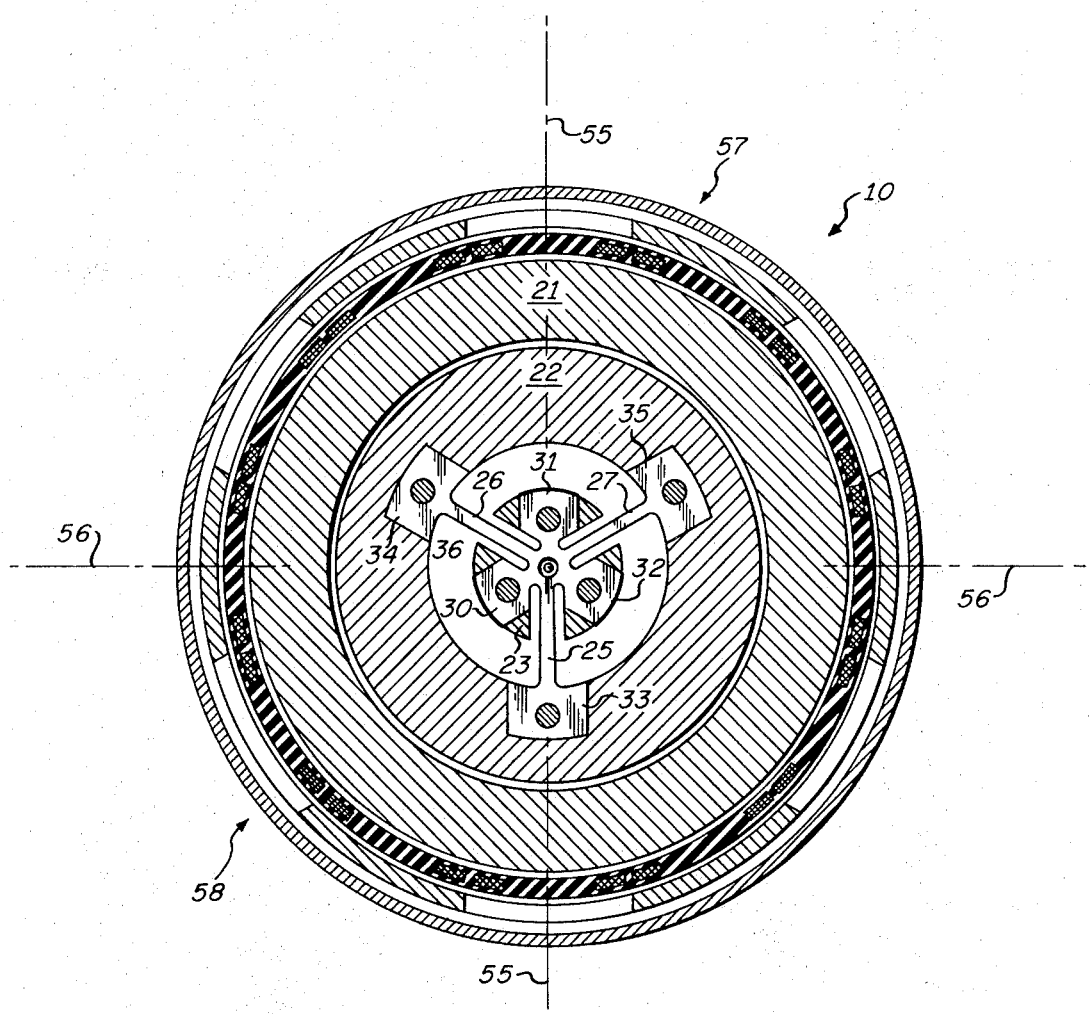
FIG. 2 is a cross-sectional view taken along lines 2—2 of FIG. 1.

Referring now to FIGS. 1 and 2, a gyroscope 10 is shown having a housing 11 within which are mounted anti-friction bearings 12 and 13 that journal a drive shaft 15 for rotation about a spin axis 14. The drive shaft 15 is rotated by a conventional synchronous spin motor 16. A gyroscopic rotor 20 having a heavy inertia rim 21 and a web 22 is radially supported on an extension or hub 23 of the drive shaft 15 by means of a radial flexure support member 24. The support member 24 is shown more clearly in FIG. 2 to have three equiangularly disposed resilient ligaments 25, 26 and 27 which flexibly support the gyroscopic rotor 20 about the spin axis 14 for universal tilting about axes perpendicular to the spin axis 14. The inner extremities of the radial ligaments 25, 26 and 27 are secured to the drive shaft 15 by means of equiangularly disposed mounting pads 30, 31 and 32 which may be welded or bolted to the hub 23. The outer extremities of the ligaments 25, 26 and 27 have mounting pads 33, 34 and 35, respectively, which are secured by welding or bolting to the web 22 of the gyroscopic rotor 20. The radial ligaments 25, 26 and 27 transmit driving torques from the drive shaft 15 to the gyroscopic rotor 20. The flexure support member 24 has a central aperture 36.

Axial support of the gyroscopic rotor 20 is provided by another flexure support means 40. The flexure support means 40 comprises a rod 41 of high quality spring steel that may be machined to provide a first flexible strut 42 which extends through the aperture 36 and has one extremity 43 secured within a central opening to a mounting member 44. The member 44 in turn is mounted on the hub 23. The other extremity of the flexible strut 42 is secured within a hollow projection 45 of the web 22 to provide for universal tilting of the gyroscopic rotor 20 about axes perpendicular to the spin axis 14. For this purpose the rod 41 including the flexible strut 42 is disposed coaxially with the spin axis 14 and the intersection of the flexible strut 42 with the plane defined by the flexure member 24 is preferably located substantially at the center of gravity of the gyroscopic rotor 20.

The second portion of the rod 41 includes another flexible strut 46 which has one extremity connected to the projection 45 and its other extremity coupled to the center of a resilient diaphragm 47. The diaphragm 47 is adjustably secured at its periphery to an enlarged cylindrical extension 50 of the drive shaft 15. An adjustable compressive force may be applied to the rod 41 via the resilient diaphragm 47 by means of an adjusting member 51 which is threadably screwed to the extension 50 to provide a force in a direction parallel to the axis 14 near the periphery of the diaphragm 47. The amount of compression is adjusted by positioning the member 51 until the spring centering gradient of the flexure support member 24 and that of the flexible strut 42 is cancelled by the overturning spring centering gradient of the compressive forces acting via the resilient diaphragm 47 and rod 41.

Figure 3:
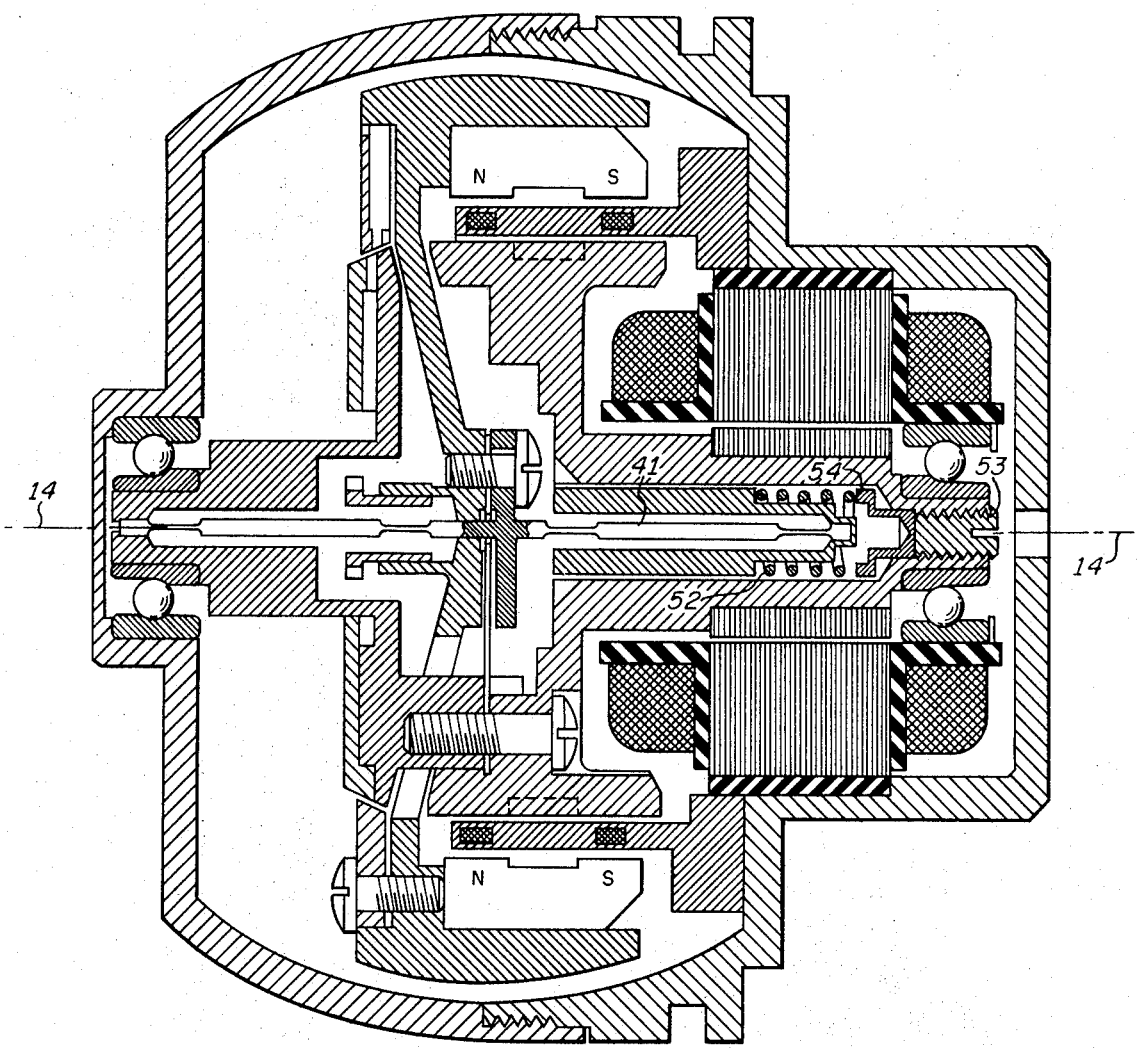
FIG. 3 is an elevation view in cross-section of an alternative embodiment of the adjustable resilient loading means of the present invention.

Alternatively, as shown in FIG. 3, the compressive force applied to the rod 41 may be applied by means of a helical spring 52 that is coaxially disposed with respect to the axis 14 for applying a compressive force in accordance with the adjustment of an adjusting screw 53 which abuts against a slideable cap 54 that is cooperative with the other extremity of the helical spring 52.

Figure 4:
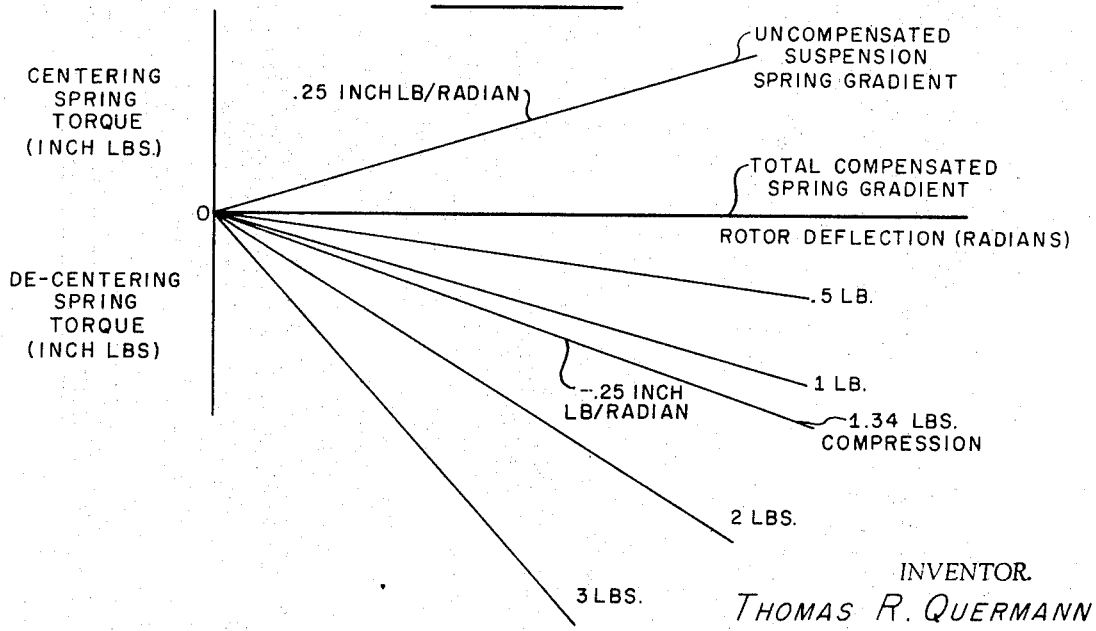
FIG. 4 is a graph of the spring gradient versus rotor deflection showing the compensation achieved by the present invention.

As shown in the graph of FIG. 4, the positive or centering spring gradient associated with the flexure support member 24 and the flexible strut 42 is preferably cancelled by the negative or decentering spring gradient caused by the compressive force applied along the rod 41 by the resilient diaphragm 47 to provide zero restoring torque throughout the range of rotor deflection.

In operation, the gyroscopic rotor 20 spins at a relatively high speed about the spin axis 14 and may provide an output as a function of the deflection thereof about two perpendicular axes such as 55 and 56 from suitable pick-offs 57 and 58. Assuming motion of the craft upon which the gyroscope 10 is mounted to cause tilt of the gyroscopic rotor 20 about the axis 56, the ligaments 25, 26 and 27 will flex to permit tilting about the axis 26. Further, the flexible strut 42 will flex to permit the same movement of the gyroscopic rotor 20; both with respect to the drive shaft 15. The flexure of the member 24 and the strut 42 results, in the absence of the present invention, in a restoring or positive spring centering gradient as indicated in FIG. 4 as a function of the rotor deflection. If this undesired restoring spring gradient is not reduced to zero, any imperfections in the inertial platform or torque feedback servo used to maintain the gyro pick-off at null or any shift in the null position of the gyro pick-off 57 will result in gyro drift. The magnitude of the drift is proportional to the restoring suspension spring centering gradient and the amount of the null error. This sensitivity is sometimes stated in degrees per hour per second of arc or as a pseudo time constant equal to the inverse thereof. By adjusting the member 51 until the restoring or positive spring centering gradient is cancelled by the negative spring centering gradient due to the compressive forces applied to the rod 41, a zero centering spring gradient may be provided throughout the range of deflection of the gyroscopic rotor 20.

An example of the forces necessary can be appreciated from the following example wherein the gyroscopic rotor 20 weighed approximately 60 grams. The three-spoked flexure member 24 was etched from a sheet of .003" thick beryllium copper with each ligament being .020" wide and approximately ¼" long attached to the wheel at a radius of .050". The ligaments 25, 26 and 27 may be installed with a tensile preload depending upon the desired natural frequency. The rod 41 may be machined from a single piece of beryllium copper or may consist of two pieces with the flexure strut 42 having a cylindrical section of .007" diameter by .100" long and with the flexure strut 46 having a diameter of .0055" by .055" long and located approximately .187" from the intersection of the flexible strut 42 and the flexure member 24.

Under these conditions, the restoring or positive spring centering gradient for the flexure member 24 and the flexible strut 42 is approximately .25 inch pounds per radian. By applying a load of approximately 1.34 pounds via the resilient diaphragm 47 to the rod 41, a negative or toggling spring centering gradient of .25 inch pounds per radian is achieved such that the resultant is the desired zero spring gradient throughout the rotor deflection as shown in FIG. 4. Compression adjustments may also be made to achieve pseudo time constants. Preferably, all the spring elements have the same thermoelastic coefficient so that the compensation is independent of temperature.

It will be noted that the rotor suspension described above is not symmetric and has been designed this way to achieve a constancy of spring centering gradient independent of acceleration effects or attitude changes. Since the weight of the rod 41 is negligible compared to the compressive forces exerted by the resilient diaphragm 47, the compensating compressive force is substantially the same at any attitude. The load in the rod 41 varies by twice the weight of the gyroscopic rotor 20 if the attitude is changed such that the spin axis goes through 180° straight up to straight down. If the suspension were symmetric, this variation in load would alter significantly the suspension spring gradient. It will be appreciated that a symmetric configuration could be used for certain applications such as a horizontal directional gyro in an aircraft navigator where the accelerations are low and of short duration for achieving improvement in mass balance stability, as shown in FIG. 3.

While the invention has been described in its preferred embodiment, it is to be understood that the words which have been used are words of description rather than limitation and that changes may be made without departing from the true scope and spirit of the invention in its broader aspects.

What is claimed is:

1. In gyroscopic apparatus having a gyroscopic rotor adapted for spinning about a spin axis by means of a drive shaft, an improved rotor suspension comprising
a drive shaft,
first flexure support means radially supporting said gyroscopic rotor on said drive shaft for universal tilting about axes perpendicular to said spin axis and having a first spring centering gradient characteristic, and
second flexure support means axially supporting said gyroscopic rotor on said drive shaft and coaxial with said spin axis having a first portion extending through said first flexure support means for universal tilting about axes perpendicular to said spin axis and having a second spring centering gradient characteristics,
said second flexure support means having a second portion with a third spring centering gradient characteristic, said first and second spring centering gradient characteristics tending to be compensated by said third spring centering gradient characteristic by adjustment of said second portion.

2. In gyroscopic apparatus of the character recited in claim 1 in which said first flexure support means includes a flexure support member having a plurality of flexible ligaments connecting said gyroscopic rotor to said drive shaft.

3. In gyroscopic apparatus of the character recited in claim 1 in which said first portion of said second flexure support means includes a first flexible strut connecting said drive shaft and said gyroscopic rotor for providing said second spring centering gradient characteristic and said second portion of said second flexure support means includes a second flexible strut cooperative with adjustable resilient loading means for providing said third spring centering gradient characteristic whereby said first and second spring centering gradient characteristics are effectively compensated by said third spring centering gradient characteristics.

4. In gyroscopic apparatus of the character recited in claim 3 in which said adjustable resilient loading means includes a resilient diaphragm coupled to said second portion.

5. In gyroscopic apparatus of the character recited in claim 3 in which said adjustable resilient loading means includes a helical spring coupled to said second portion.

6. In gyroscopic apparatus of the character recited in claim 3 in which said first flexure support means includes a flexure support member having a plurality of flexible ligaments connecting said gyroscopic rotor to said drive shaft for providing said first spring centering gradient characteristic, and said flexure support member and said first flexible strut intersect at substantially the center of gravity of said gyroscopic rotor.

References Cited

UNITED STATES PATENTS

| | | | |
|---|---|---|---|
| 2,735,731 | 2/1956 | Freebairn et al. | 74—5 XR |
| 3,211,011 | 10/1965 | Litty | 74—5 |
| 3,264,880 | 8/1966 | Fischel | 74—5 |
| 3,301,073 | 1/1967 | Howe | 74—5.7 |
| 3,315,533 | 4/1967 | Litty | 74—5 |
| 3,430,276 | 3/1969 | Ashley et al. | 74—5 |

FRED C. MATTERN, Jr., Primary Examiner

M. A. ANTONAKAS, Assistant Examiner